United States Patent [19]

Sugimoto

[11] 4,369,686
[45] Jan. 25, 1983

[54] METAL-SAWING MACHINE

[75] Inventor: Tadahiro Sugimoto, Amagasaki, Japan

[73] Assignee: Daito Seiki Company Limited, Osaka, Japan

[21] Appl. No.: 227,717

[22] Filed: Jan. 23, 1981

[30] Foreign Application Priority Data

Jan. 31, 1980 [JP] Japan .................................. 55-11177

[51] Int. Cl.$^3$ ............................................ B23D 55/08
[52] U.S. Cl. ........................................ 83/801; 83/746
[58] Field of Search ................ 83/746, 747, 794, 796, 83/798, 801, 788; 125/11 R, 21

[56] References Cited

U.S. PATENT DOCUMENTS 3,077,132  2/1963  Whitmore .......................... 83/794 X Primary Examiner—James M. Meister
Attorney, Agent, or Firm—Koda and Androlia

[57] ABSTRACT

The invention provides a metal-sawing machine including a guide frame vertically movable with respect to a work to be cut, a saw carrier capable of rocking in the cutting plane with respect to said work, a pair of servo-cylinders one on the left-hand section and the other on the right-hand section of said saw carrier, each of said servo-cylinders being connected at one end to said guide frame at a first pivotal point while the opposite end thereof is connected to said saw carrier at a second pivotal point, a rocking motion control means for alternately differentiating the distance between said first and second pivotal points of each of said servo-cylinders, and a guide means for preventing said saw carrier from horizontal displacement with respect to the line of cutting action of the saw blade while in its rocking motion.

5 Claims, 8 Drawing Figures

METAL-SAWING MACHINE

BACKGROUND OF THE INVENTION

1. Field of the Invention

The present invention relates to a metal-sawing machine, and more particularly, to a metal-sawing machine having a saw carrier capable of rocking in the cutting plane with respect to a work to be cut, such that the saw blade is caused to pass through the work in an efficient manner by following a desired arch-like path or trace.

2. Description of the Prior Art

It is known in the art to employ a saw carrier capable of rocking with respect to a work. This type of metal-sawing machine cuts a work more efficiently than the conventional sawing machines which cut a work in the simple horizontal movement of saw blade. As shown in FIG. 1, in such conventional cutting methods the blade edge comes into contact with the whole section of the work with the result of causing a large drag therebetween. In addition, the blade edge is likely to slip on the surface of the work. On the other hand, the adoption of a rocking saw blade has eliminated this drawback, because the blade edge keeps contact with relatively small portion of the section of a work with the result of reducing the cutting drag. In addition, the slipping of saw edge has been avoided. In this way the cutting efficiency has been considerably improved. For effecting such rocking motion of saw blades there are many devices; among which the crank system is in common use. For example, the Japanese laid-open patent specification No. 54-137786 discloses a typical example thereof. Under the crank system, however, it is difficult to lead the saw blade exactly in an arch-like manner, and as shown in FIG. 2 its trace seems arch-like, but in fact it is not; the seemingly arch-like trace consists of two straight lines with a curved portion therebetween. When a saw blade is caused to enter a work in such an inexact arch-like manner, the contact of the blade edge with the work is likely to differ in the see-saw motion of the saw blade as indicated by the letter 1. In addition, the rocking speed is different between in the central portion and at opposite end portions, and the adjustment is difficult. Furthermore, the crank mechanism requires a relatively long distance between the crank section and the working section of the saw blade. Consequently, a large moment of force is likely to occur under the cutting load, and consequently, undesirable vibrations of the saw carrier are amplified to make noise and cause cutting errors.

The present invention is directed to the solution of the problems mentioned above with respect to the conventional saw-blade rocking system, and has for its object to provide an improved metal-sawing machine in which the saw blade can rock along an ideal arch-like trace with respect to a work.

Another object of the present invention is to provide an improved metal-sawing machine in which the mode of a see-saw motion of the saw blade can be predetermined as desired.

A further object of the present invention is to provide an improved metal-sawing machine in which the saw carrier can smoothly rock without causing undesirable vibrations.

Other objects and advantages of the present invention will become apparent from the detailed description given hereinafter; it should be understood, however, that the detailed description and specific embodiments are given by way of illustration only, since various changes and modifications within the spirit and scope of the invention will become apparent to those skilled in the art from this detailed description.

SUMMARY OF THE INVENTION

According to one aspect of the present invention, a metal-sawing machine includes a guide frame vertically movable with respect to a work to be cut, a saw carrier capable of rocking in the cutting plane with respect to said work, a pair of servo-cylinders one on the left-hand section and the other on the right-hand section of said saw carrier, each of said servo-cylinders being connected at one end to said guide frame at a first pivotal point while the opposite end thereof is connected to said saw carrier at a second pivotal point, a rocking motion control means for alternately differentiating the distance between said first and second pivotal points of each of said servo-cylinders, and a guide means for preventing said saw carrier from horizontal displacement with respect to the line of cutting action of the saw blade while in its rocking motion.

DETAILED DESCRIPTION OF THE INVENTION

Figure 1:
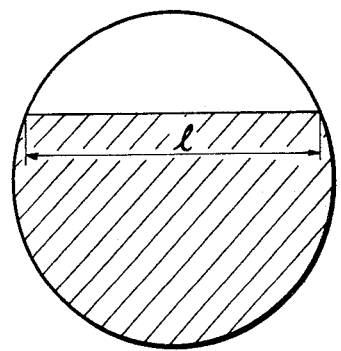
FIG. 1 is a cross-section of a work being cut by a saw blade running in one horizontal direction.
Figure 2:
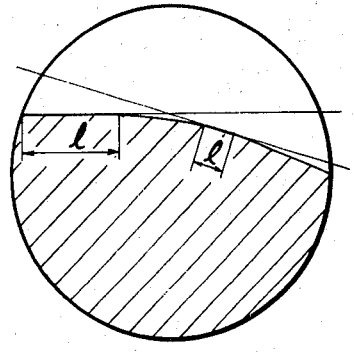
FIG. 2 is a cross-section of a work being cut by a saw blade rocking under the conventional system.
Figure 3:
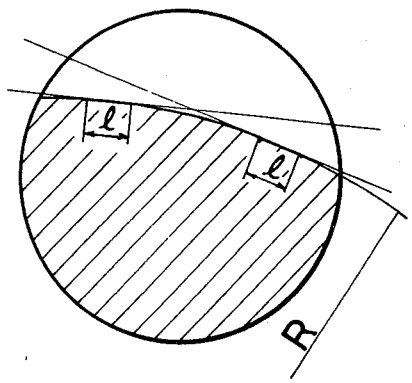
FIG. 3 is a cross-section of a work being cut by a saw blade rocking under the present invention.
Figure 4:
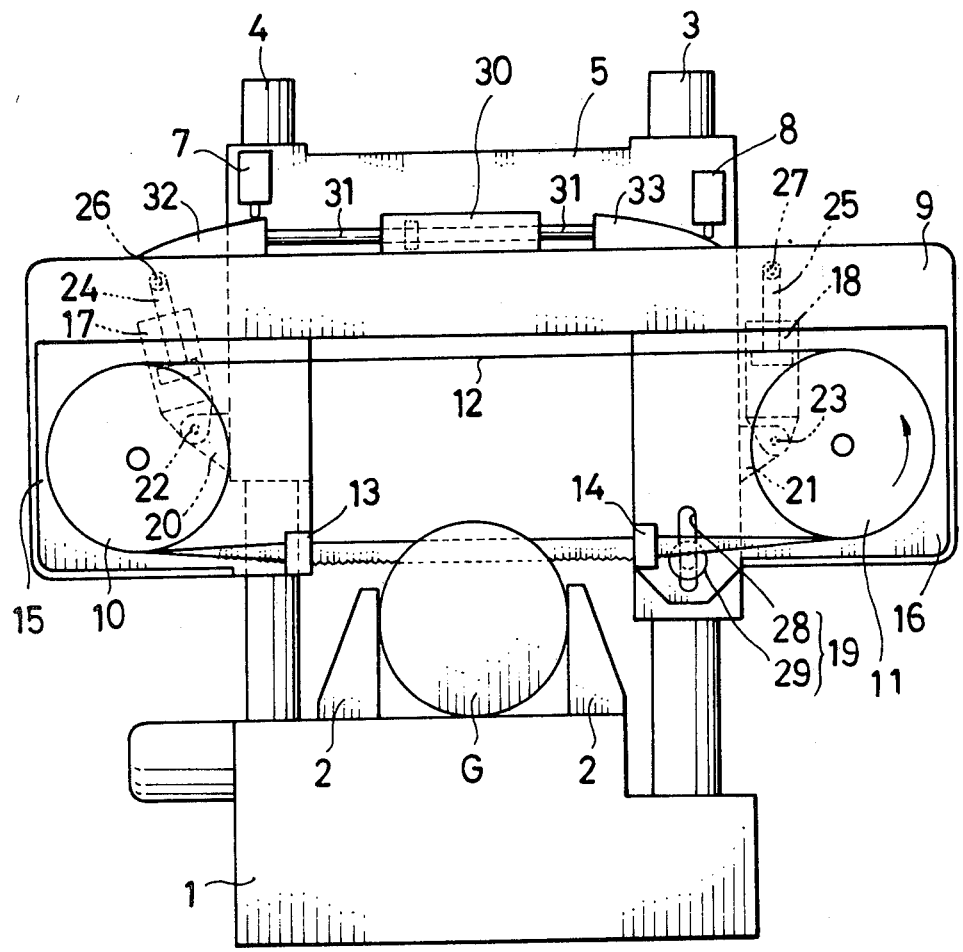
FIG. 4 is a front view of a metal-sawing machine embodying the present invention.
Figure 5:
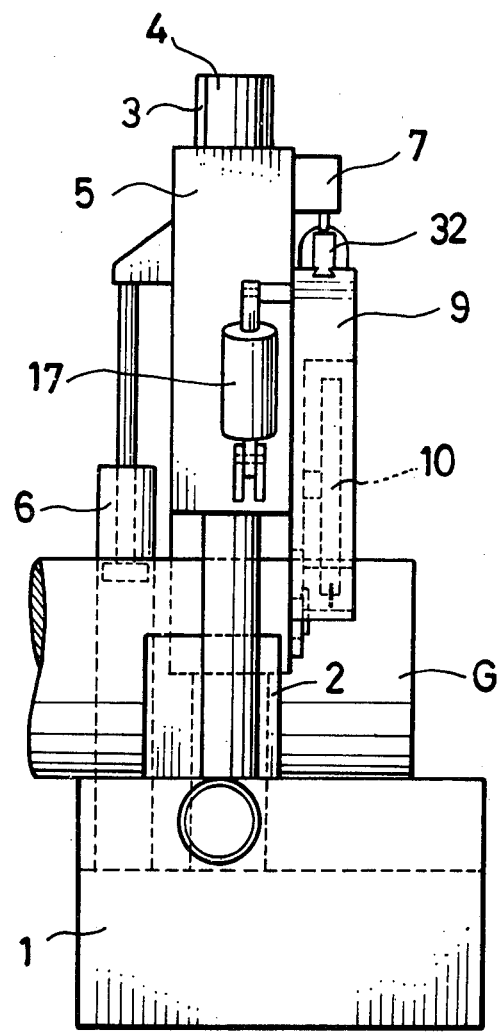
FIG. 5 is a side view of the metal-sawing machine in FIG. 4.

Referring to FIG. 4 a vise having a pair of jaws 2 is mounted on a bed 1 to hold a work (G). Two columns 3 and 4 are uprightly supported on the bed 1, wherein the column 3 will be referred to as the main column while the column 4 as the subordinate column. A guide frame 5 is carried on the columns 3 and 4, such that it can be vertically moved by means of a hydraulic feed cylinder 6. The guide frame 5 is provided with two servo-valves 7 and 8, whose feelers 83 project downwards. A saw carrier 9 includes a pair of saw wheels 10 and 11, on which an endless saw blade 12 is carried with saw guides 13 and 14 interposed. The saw guides 13 and 14 are adapted to allow the blade edge to become upright with respect to the work (G) so as to cut a kerf therein.

The saw carrier 9 is carried on the guide frame 5 through servo-cylinders 17 and 18 and a guide unit 19, such that the saw carrier can rock like a see-saw under the interaction of these members 17, 18 and 19. The servo-cylinder 17 is carried on a bracket 20 fastened to the guide frame 5 through a pivot 22, and the piston rod 24 thereof is fastened to the saw carrier 9 through a pivot 26. Likewise, the servo-cylinder 18 is carried on the guide frame 5 and the saw carrier 9 through pivots 23 and 27, wherein the reference numerals 21 and 25 designate a bracket and a piston rod, respectively. The guide unit 19 consists of a slot 28 vertically produced in the saw carrier 9 and a projection 29 upright on the guide frame 5, wherein the projection is engaged in the slot to constitute a unitary construction. The guide unit 19 is located on the line of cutting action of the saw blade 12.

The saw carrier 9 is provided with an oblique plate carrier 30, which includes a pilot cylinder 30, piston rods 31, and oblique plates 32 and 33. The oblique plate 32 is engaged with the servo-valve 7, and the oblique plate 33 is engaged with the servo-valve 8. These oblique plates have symmetrically shaped slant faces which keep contact with the servo-valves 7 and 8. In a preferred embodiment each oblique plate has a gradual slop for its slant face as clearly shown in FIG. 8. The height and curve of the slant face is decided by previously calculating on the desired arch-like trace to be followed by the saw blade with respect to the work, which means that the saw blade can be caused to follow the ideal layout trace.

Figure 7:
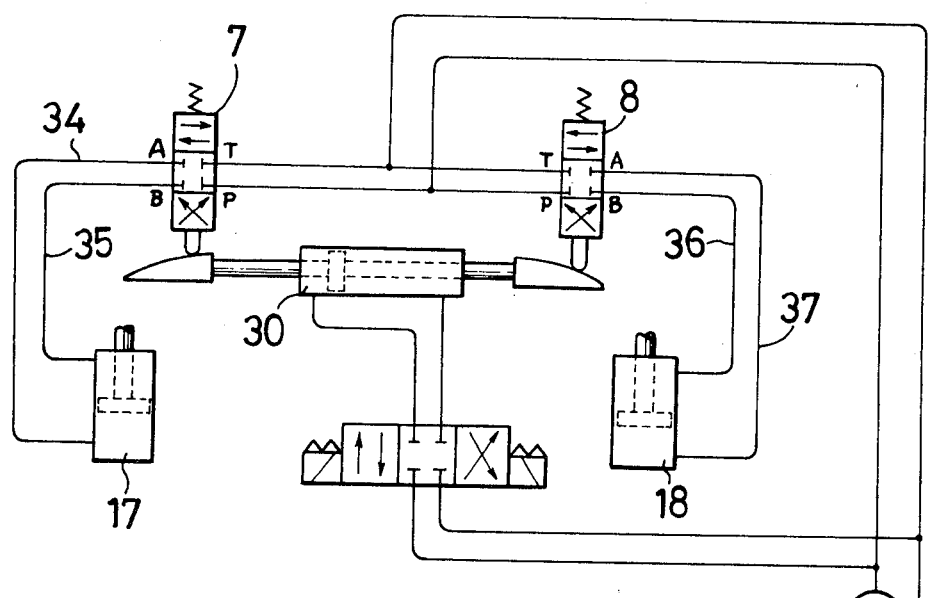
FIG. 7 is a hydraulic flow diagram.
Figure 8:
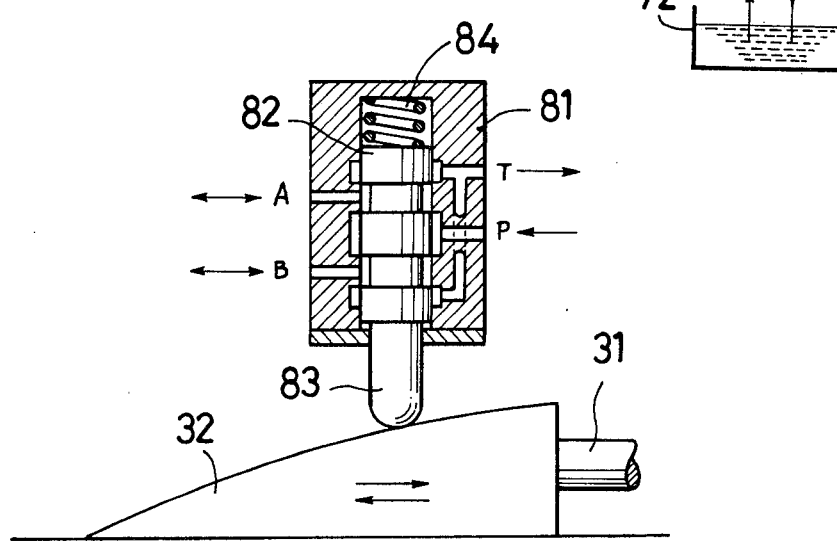
FIG. 8 is a cross-section on an enlarged scale of a servo-valve, additionally showing a relationship thereof with an oblique plate.

FIG. 7 is a hydraulic flow diagram, and FIG. 8 shows the relationship between the servo-valve and the oblique plate, in which the internal structure of the servo-valve is clearly shown.

Each servo-valve includes a valve body 81, a spool 82 slidable in the valve body, the spool including the feeler 83 at its terminating end, and a coil spring 84 located at the back of the spool. In addition, the valve is provided with four ports P, T, A and B. The port P receives oil from a pump 71, and the port T allows the oil in the valve body to discharge therethrough to a reservoir 72. The ports A and B open and close in accordance with the position of the spool 82 in the valve body. When the spool is displaced downwards from its state of equilibrium shown in FIG. 8, the oil is fed from the port P to the port A and the port B allows the oil to return to the reservoir 72. When the spool is upwardly displaced, the oil is fed from the port P to the port B, and the port A allows the oil to return to the reservoir 72. The spool is provided with ring-shaped recesses through which the ports P, T, A and B communicate with each other.

The left-hand servo-valve 7 controls the left-hand servo-cylinder 18, and the right-hand servo-valve 8 controls the right-hand servo-cylinder 18 under the hydraulic action as shown in FIG. 7. The port A of the servo-valve 7 communicates with the servo-cylinder 17 by means of a hose 34 connected to the lower section of the servo-cylinder, and the port B communicates with the servo-cylinder 17 by means of a hose 35 connected to the upper section thereof. The right-hand servo-valve 8 communicates with the servo-cylinder 18 by means of hoses 36 and 37 in the same manner as described with respect to the left-hand servo-valve 7.

Referring to FIG. 4, now suppose that the piston rod 31 of the pilot cylinder 30 is forced rightwards from the position shown in the drawing. Then the point of contact between the servo-valve 7 and the oblique plate 32 gradually lowers, thereby causing the spool in the servo-valve to lower. As the spool lowers, the oil from the pump 71 is forced from the port P to the lower section of the servo-cylinder 17 via the port A. The oil in the upper section of the servo-cylinder 17 is forced to return to the reservoir 72 via the ports B and T, thereby causing the piston rod 24 of the servo-cylinder 17 to rise gradually, and enlarging the distance between the two pivots 22 and 26.

Figure 6:
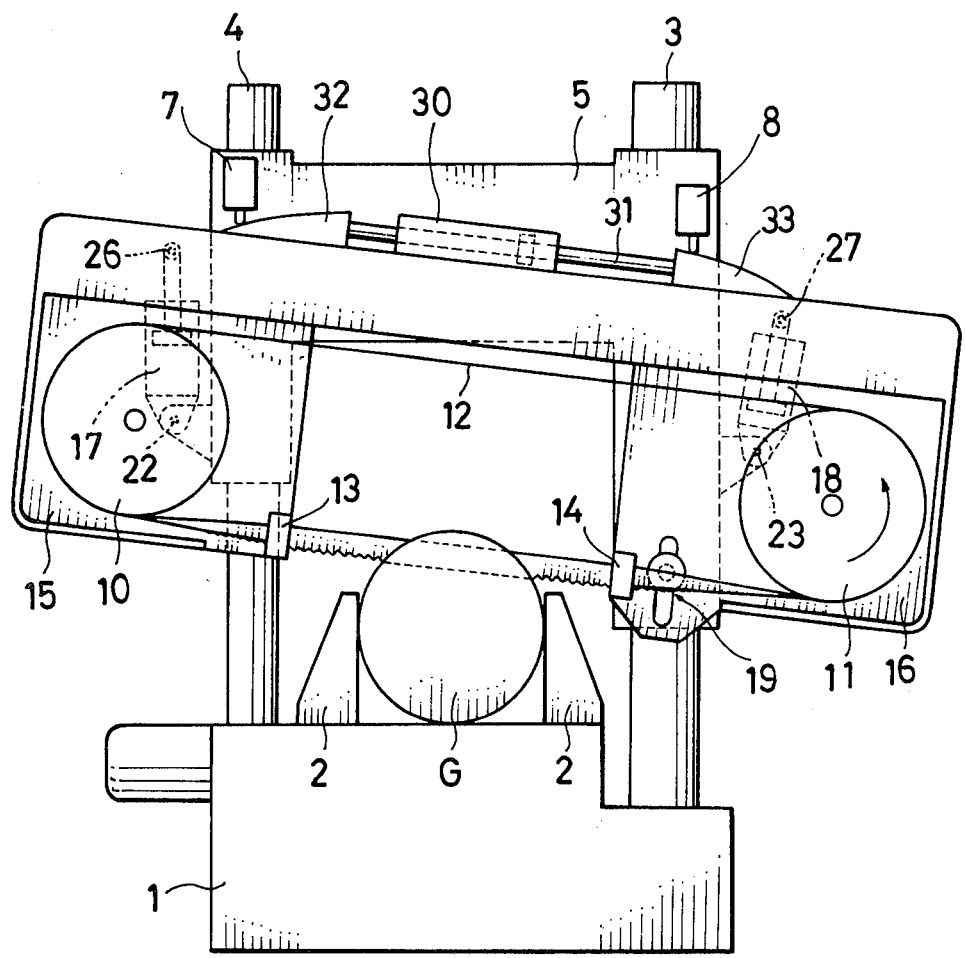
FIG. 6 is a front view of the metal-sawing machine, particularly showing the operation thereof.

On the other hand, the point of contact between the right-hand servo-valve 8 and the oblique plate 33 gradually rises, thereby causing the piston rod 25 of the right-hand servo-cylinder 18 to lower and shortening the distance between the pivots 23 and 27. Thus, the saw carrier declines rightwards as shown in FIG. 6. As the guide unit 19 is located on the line of cutting action of the saw blade, the saw carrier is prevented from any displacement likely to occur due to the weight thereof and/or the cutting resistance. In addition, there is no likelihood for the moment of force to exert an excessive force not only onto the saw blade but also onto the whole mechanism, wherein a negligible reaction to the cutting resistance unavoidably exerts in the slot 28 of the guide unit.

When the piston rod 31 of the pilot cylinder 30 is forced leftwards, thereby causing the oil to flow in the reverse direction, the piston rod 24 of the left-hand servo-cylinder 17 is forced downwards, while the piston rod 25 of the right-hand servo-cylinder 18 rises. Thus the saw carrier 9 rotates in the counter-clockwise direction and returns to its original posture as shown in FIG. 4. In this way the saw carrier 9 rocks like a see-saw within the limit provided by the guide unit 19.

In general, it is not easy to impart a see-saw motion to a saw carrier because of its heavy weight and the cutting resistance exerting on the saw blade, and a relatively large power will be required. According to the present invention, the "power" is simply attained by the use of servo-cylinders, and the see-saw motion is easily controlled by the use of the oblique plates, 32 and 33, the pilot cylinder 30 and the guide unit 19. These are not heavy-load devices, but they are lightweight with a simplified structure.

The profile of the slant face of each oblique plate determines the trace to be followed by the saw blade. As described above, its profile can be designed as desired. If the profile is designed as shown in FIG. 8, the saw blade will pass through the work following an almost perfect arch-like trace.

The present invention is not limited to the illustrated embodiment, and in an alternative arrangement the pilot cylinder 30 can be replaced by a rack unit driven by an electric motor. The rack is reciprocally moved between the servo-valves. A further alternative is that a microprocessor with LSI and a read-only memory are jointly employed so as to obtain periodical signals therefrom, which signals are used as the reference value for measuring the amount of displacement of the saw carrier due to its rocking motion. Then a feedback control is electrically effected so as to enable the measured value to come into accord with the reference value.

As evident from the foregoing, the cutting trace to be following by the saw blade can be predetermined by deciding the profile of the oblique plates. This is extremely advantageous in that the cutting efficiency can be controlled by variously designing the profiles of the oblique plates. When the saw blade cuts a work along an ideal arch-like trace in its see-saw motion, the effective cutting length of the saw blade is the same at any point during the see-saw motion. This will be of particular advantage when the work is large-sized or hard, such as stainless steel ingot. The see-saw motion of the saw blade is effected by the servo-mechanism without the necessity for providing a great control power, which leads to a small, light construction of the mechanism. In addition, as the guide unit is located in the line of cutting action of the saw blade, no appreciable moment of force occurs even under the weight of the saw carrier and the cutting load, only with a negligible amount of reaction occurring in the slot of the guide unit. As a result, the saw blade can rock smoothly without undersirable vibrations, and the cutting proceeds in silence with high efficiency.

What is claimed is:

1. A metal-sawing machine for cutting a work in the rocking motion of a saw blade, which machine comprises:
    a guide frame vertically movable with respect to a vice mounted on a bed, said vice being adapted to hold a work;
    a saw carrier including a pair of saw wheels on which an endless saw blade is carried so as to run in a loop around said saw wheels;
    a pair of servo-cylinders one on the left-hand section and the other on the right-hand section of said saw carrier;
    each of said servo-cylinders being connected at its one end to said guide frame at a first pivotal point while the opposite end thereof is connected to said saw carrier at a second pivotal point;
    rocking motion control means for alternately differentiating the distance between said first and second pivotal points of each of said servo-cylinders, thereby enabling said saw carrier to rock in the cutting plane with respect to said work held on said vice; and
    guide means for preventing said saw carrier from horizontal displacement with respect to said work.

2. A metal-sawing machine as set forth in claim 1, wherein said rocking motion control means includes a means for driving left-hand oblique plate and right-hand oblique plate to the left and right, a pair of servo-valves corresponding to said servo-cylinders, said servo-valve being adapted to control said servo-cylinder independently, said oblique plates being engaged with said servo-valves, said means for driving said oblique plates being mounted on said saw carrier while said servo-valves are mounted on said guide frame.

3. A metal-sawing machine as set forth in claim 2, wherein said means for driving said oblique plates is mounted on said guide frame while said pilot valves are mounted on said saw-carrier.

4. A metal-sawing machine as set forth in claim 1, wherein said rocking motion control means includes a means for driving left-hand oblique plate and right-hand oblique plate as a whole along said saw carrier to the left and right, a pair of servo-valves mounted on said guide frame one corresponding to said left-hand servo-cylinder and the other corresponding to said right-hand servo-cylinder such that said servo-valves alternately drive said servo-cylinders in accordance with the reciprocating movement of said oblique plates.

5. A metal-sawing machine as set forth in claim 4, wherein each of said oblique plate has a slant face on top whose inner portion is higher than its outer portion with its middle portion being convexed.

* * * * *